June 23, 1959  O. MUSGRAVE  2,891,370
POWER LAWN MOWER
Filed Aug. 16, 1954  3 Sheets-Sheet 1
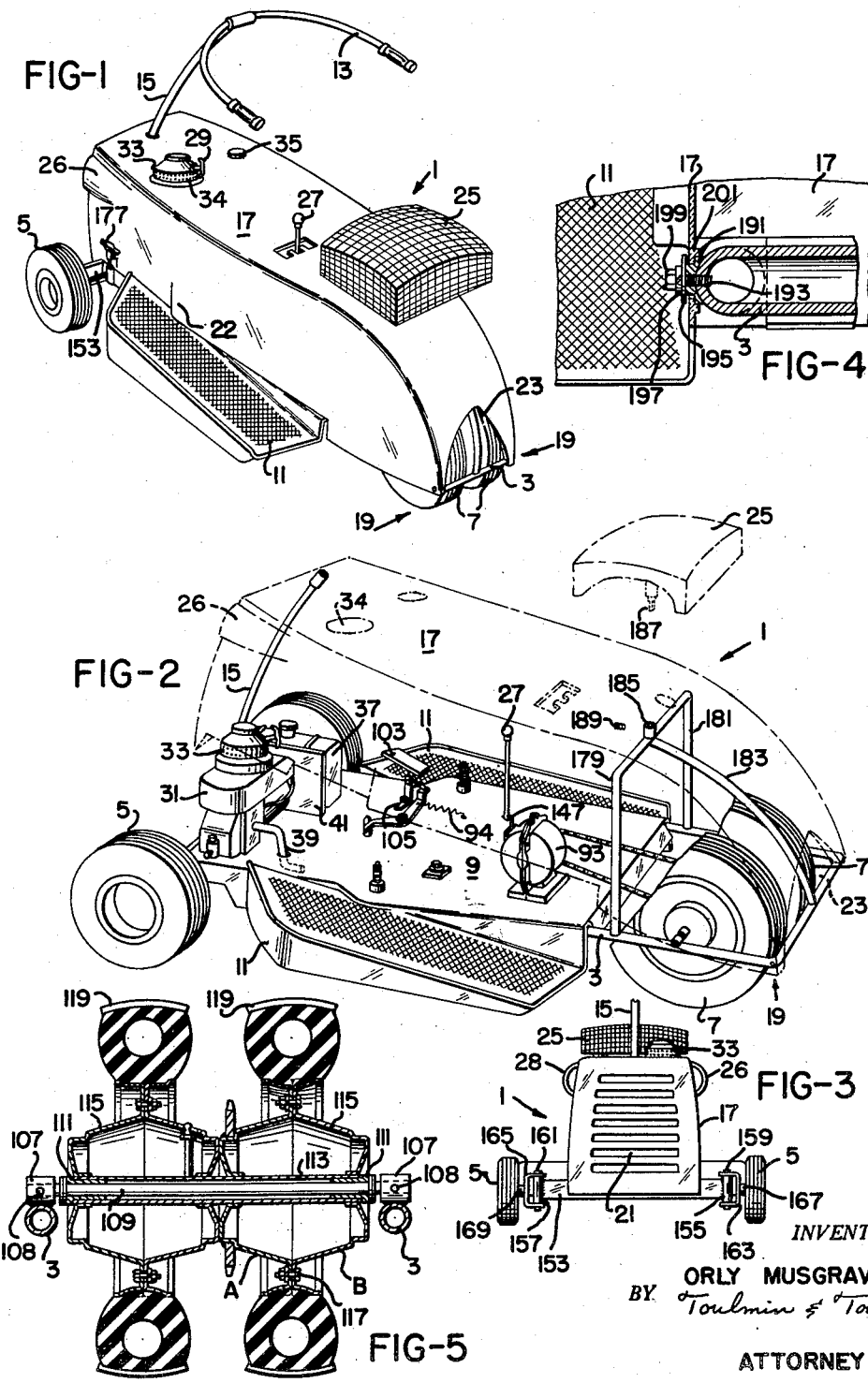
INVENTOR.
ORLY MUSGRAVE
BY Toulmin & Toulmin
ATTORNEY

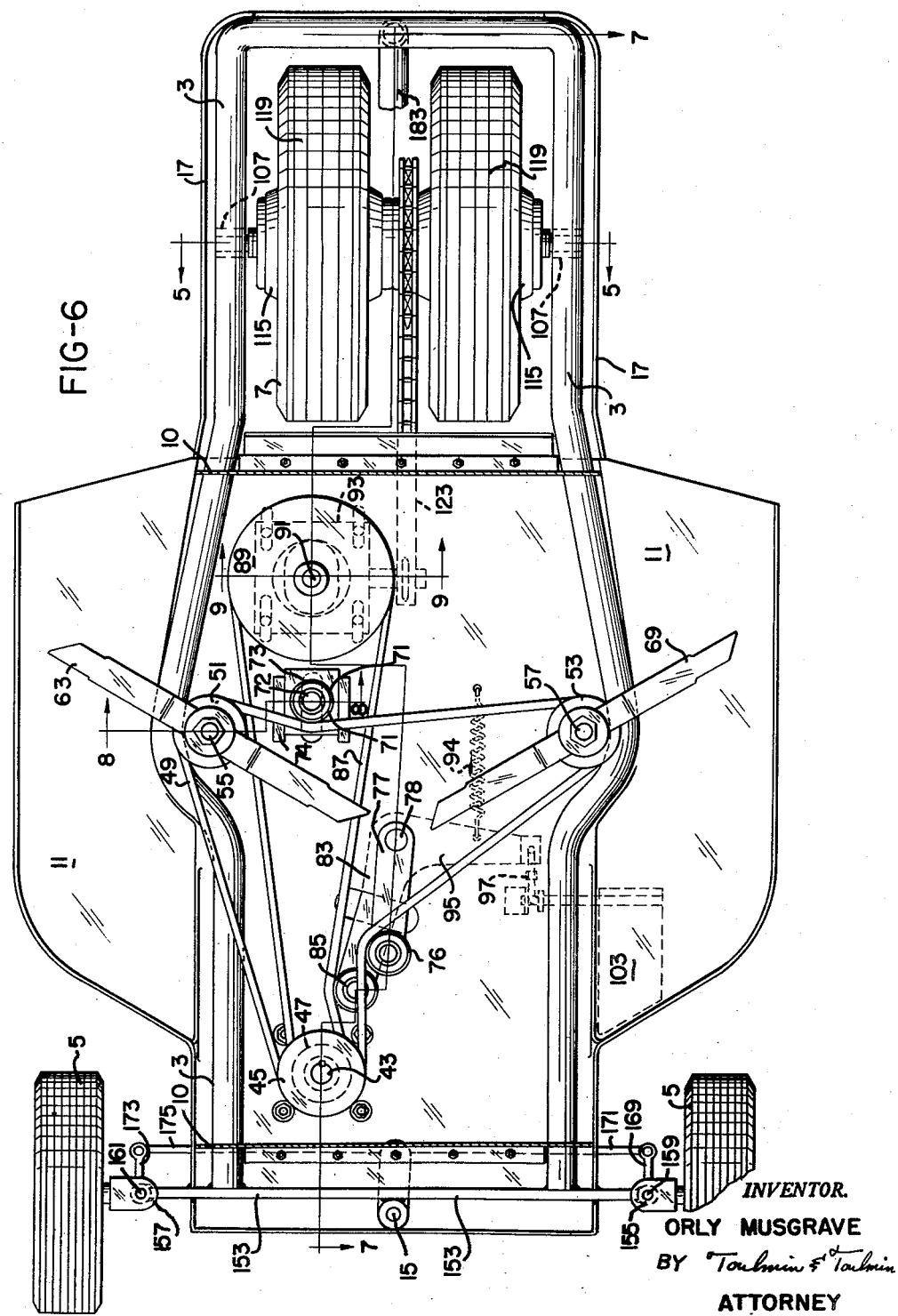

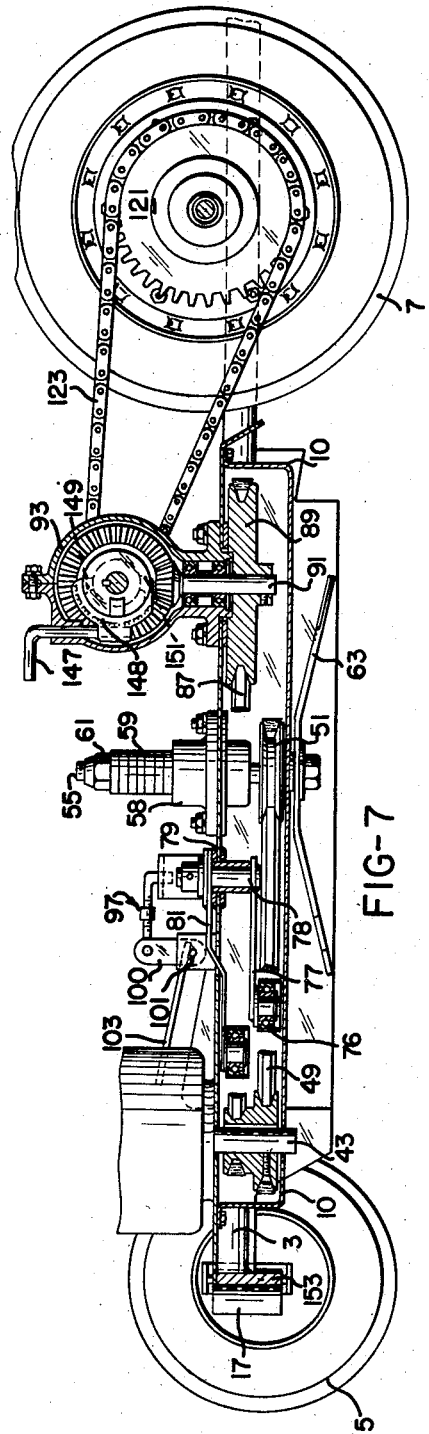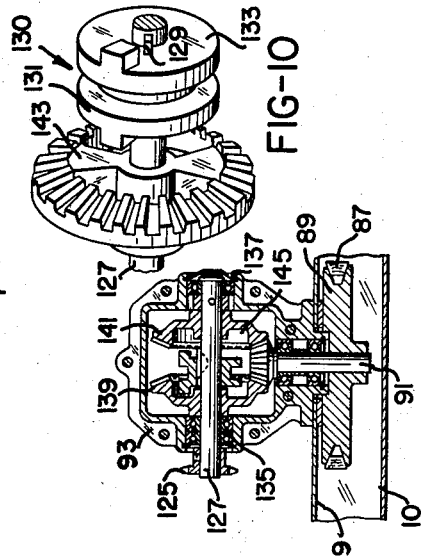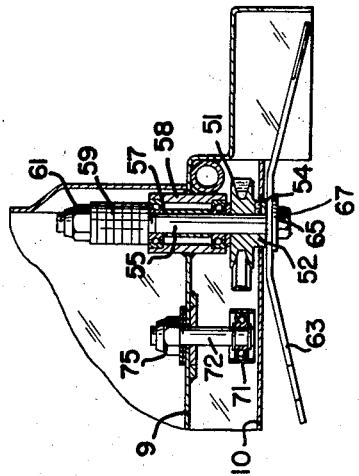

United States Patent Office 2,891,370
Patented June 23, 1959

2,891,370

POWER LAWN MOWER

Orly Musgrave, Springfield, Ohio

Application August 16, 1954, Serial No. 450,141

4 Claims. (Cl. 56—25.4)

This invention relates generally to power driven, rider-controlled grounds tending equipment and more specifically to power lawn mowers in which substantially all of the driving mechanism is protected by enclosing means atop which a seat is provided for the operator of the mower.

Rider-controlled power lawn mowers are in general driven by gasoline engines of two to three horse-power, the power of the engine being utilized to propel the mower as well as to drive the cutting equipment. Such engines develop considerable heat and are customarily air-cooled since they are normally employed under conditions where weight is an important factor. Further, the engine when incorporated into mowers usually has, in closely spaced relationship therewith, a fuel supply, transmission mechanism, and other operating gear which it is desired to maintain as cool running as possible by dissipating the heat of the engine freely to the atmosphere. The proximity of the rider to this source of heat and to the operating mechanism contribute to rider discomfort.

It is a primary object of this invention to provide a rider-controlled powered lawn mower in which discomfiture to an operator occasioned by proximity to heat and operating equipment of the mower is substantially completely avoided.

It is an important object of the invention to provide a rider-controlled power driven grounds tending vehicle in which a hood substantially completely encloses the power means and transmission equipment of the vehicle and protects the equipment from the dust and cuttings usually associated with the operation while at the same time affording the rider comfort and complete protection from contact with the operating mechanism.

It is a particular object of the invention to provide a rider-controlled power driven lawn mower in which driving wheel means are protected and arranged to afford a mower of improved stability.

Another object of the invention is the provision in a rider-controlled power driven lawn mower of novel transmission mechanism.

The invention will be more fully understood by reference to the following detailed description and accompanying drawings wherein:

Figure 1 is a perspective view of a rider-controlled power driven lawn mower incorporating the features of this invention;

Figure 2 is a perspective view, with the hood in phantom, illustrating the arrangement of the components in a preferred embodiment of the invention;

Figure 3 is a front elevational view of the mower of Figure 1;

Figure 4 is a view partially in section, and enlarged, of a portion of the structure of Figure 1;

Figure 5 is a sectional view illustrative particularly of the rear wheel arrangement of the mower of Figures 1 and 2 and taken on line 5—5 of Figure 6;

Figure 6 is an enlarged bottom view of the structure of Figures 1 and 2 partially in section;

Figure 7 is a sectional view in elevation of the structure of Figure 1 taken on line 7—7 of Figure 6;

Figure 8 is a detail view in section of a portion of the structure of Figure 7 taken on line 8—8 of Figure 6;

Figure 9 is a sectional view taken on line 9—9 of Figure 6; and

Figure 10 is a perspective view, enlarged, of a portion of the structure of Figure 9.

Referring to the drawings and initially particularly to Figures 1–3 and 6 there is shown generally at 1 a rider-controlled power driven lawn mower; the mower is provided with a tubular frame 3, forward ground wheels 5, and rearward driving ground wheels 7 which support the frame in close proximity to the ground. A floor plate 9 is provided with a suitably bolted bottom 10 (Figure 7), and has foot-receiving wings 11 to be described more particularly hereinafter; floor plate 9 is suitably welded to the frame 3 and supports the power means and control mechanism of the mower.

Forwardly of the mower steering handle means 13 extend from a steering post 15 which is operably connected with the wheels 5 for controlling the direction of movement of the wheel and mower. A hood 17, of a substantially dust impermeable material such as metal or resin impregnated glass fibers, apertured to receive steering post 15 therethrough extends rearwardly over the power means, control mechanism and rear wheels and is supported by the frame for pivotal movement to expose the plate 9 as generally indicated at 19 (Figure 2). This hood is provided forwardly with a grille 21 (Figure 3) and rearwardly at 23 (Figures 1 and 2) with an opening for the flow of air longitudinally of the mower over the power means and control mechanism. The hood tapers to a maximum width at 22 and provides for comfortable receipt of the legs of a rider.

A seat 25 is within easy reach of handle means 13 (Figure 1), a control knob at 27 and a starter 29 for the power means which is a gasoline engine positioned at the forward edge of plate adjacent grille 21 and indicated at 31 (Figure 2); the hood 17 is suitably apertured to receive therethrough the knob and starter and also the cooling air inlet 33 of the engine and the top 35 of the gasoline supply tank 37. The aperture 34 for the cooling air inlet is most suitably large enough to be spaced slightly out of contact with the metal of the engine as a downward draft about the engine is thus created. Longitudinally extending air scoops are provided in the hood laterally at 26, 28 and thus a constant flow of air longitudinally is well provided for.

Referring now particularly to Figures 2, 6 and 7 the floor plate 9 is secured to and supports the engine 31 and the exhaust conduit 39 of the engine passes through (Figure 2) the plate 9 and bottom 10 and exhausts burned gases rearwardly beneath the bottom. This effectively removes the heat and fumes from a driver on the seat, contributes to a cool spacing beneath the hood and further the rearwardly flowing exhaust gases tend to urge the grass which is to be cut into the blades in an upstanding position.

Between the engine and the gasoline supply tank 37 and supported from plate 9 is a shield 41 of insulating material; the usual gasoline supply connection between the engine and tank (not shown) may suitably pass over or through this shield.

The driving shaft 43 of the engine passes vertically through the floor plate 9 and bottom 10 and carries (Figure 6) on its lower end two V-belt pulleys 45 and 47 which are in the enclosure formed by the floor plate and bottom. Pulley 45 is of the larger diameter and is operably connected by belt 49 with V-belt pulleys 51, 53 mounted respectively on spindles 55, 57.

Spindle 55 passes vertically through floor plate 9 and the closing bottom 10 and is supported by bearings 57 the housing 58 for which is suitably bolted and welded to the floor plate as indicated in Figures 7 and 8; the housing supports a plurality of spacer elements 59 which are loosely positioned about the spindle and retained in place by nut 61 secured on the upper end of the spindle.

Pulley 51 is shouldered at 52 and the shoulder portion receives a set screw 54 to the spindle and is carried on the spindle 55 which passes through an aperture of bottom 10 and is provided with a cutting blade 63 securely retained in position by washer 65 and nut 67. The spacer elements provide for adjustment of blade height.

Spindle 57 is oppositely disposed to spindle 55, is similarly supported and itself similarly supports cutting blade 69.

The blades 63 and 69 may be easily mounted and de-mounted and the blade shape chosen with the nature of the material to be cut. Further the two blades which are each suitably 12" long require less power than one 24" blade and accordingly less heat need be developed by an engine powering the same.

Plate 9 (Figure 8) also supports idler pulley 71 which is rotatably carried on a fixed shaft 72 retained on an apertured piece 73 slidable beneath the plate 9 in guide 74 and lockable to the plate in adjusted position by nut 75. Thus the tightness of belt 49 is controllable.

A second idler pulley 76 also bears against belt 49 when the mower is in operation. This pulley is carried on an arm 77 which is welded to a rotatable shaft 78 supported by a sleeve bearing unit 79 welded to plate 9.

Shaft 78 also mounts a bell crank 81 the inner arm 83 of which extends below plate 9 and mounts idler pulley 85 which pulley in the operative condition engages a drive belt 87 and tightens the same for transmission of power to pulley 89 carried on shaft 91 of gear box 93 (Figures 2 and 7). Normally spring 94 secured to plate 9 biases the bell crank to an inoperative position.

The other and outer arm 95 of bell crank 81 is suitably coupled adjustably at 97 to an arm 99 fixedly carried between ears 100 which (Figure 7) are rockably supported on shaft 101 which carries the foot pedal 103. The ears are secured to plate 9 by a bolted angle piece 105 (Figure 2).

Stepping on pedal 103 causes ears 100 and arm 99 to rock leftwardly (Figure 7) carrying with it arm 95 and causing the bell crank to pivot at shaft 78. The inner arm which (Figure 2) passes downwardly through plate 9 then moves idler pulley 76 into contact with belt 87 to thus cause actuation of shaft 91 of the gear box 93. Thus movement of pedal 103 simultaneously drives the mower and the mower blades.

Power is transmitted through gear box 93 to the rear wheels 7, the arrangement of which will now be described, referring particularly to Figure 5. The tubular frame 3 has welded thereto housings 107 which support rigidly at pins 108 a transverse rod 109. Sleeve bearings 111 engage the rod at either end and rotatably carry sleeve 113 which supports the casings 115 of the wheels. The wheels are themselves formed in two sections indicated at A, B and bolted together as at 117. The wheels are in side by side relation with their treads 119 spaced slightly apart.

Sprocket 121 is welded to the casing of one of the wheels and (Figure 6) receives a chain 123 which also passes over a sprocket 125 on shaft 127 of the gear box 93.

The closely spaced relation of the rear driving wheels 7, on either side of the center line of the mower, provides improved stability in the mower and eliminates the necessity for a differential. The arrangement permits ease of turning and no undue wear occurs.

Shaft 127 of gear box 93 carries key 129 (Figure 10) on which a body indicated generally at 130 is slidably mounted but is non-rotatable with respect to the shaft 127. The body 130 comprises disc portions 131 and 133, each of which are provided with lugs. Shafting 127 is itself rotatably mounted in bearings 135 and 137 supported by the casing of the gear box. Also loosely mounted on shaft 127 are spaced bevel gears 139, 141, each of which are hollow and the hollows of which are provided with cross pieces 143, 145, respectively, for engagement with the lugs of the discs.

The bevel gears 139, 141 are engaged by bevel gear 147 carried on shaft 91 and when shaft 91 is rotated through pulley 89 each of the gears 139, 141 rotates loosely on the shaft. By moving the disc 131 into engagement with gear 139 movement of the mower is effected in a forward direction; when the lug of disc portion 133 is moved rightwardly (Figure 9) reversal of direction is effected. When neither lug is engaged the mower is in neutral and the gears 139, 141 are loose on the shaft.

Sliding movement for engagement of the body 130 is effected through bent rod 147 (Figure 7) which (Figures 1 and 2) carries the knob 27. The lower end of rod 147 is connected by collar 148 between the portions 131, 133 rigidly at 149, 151 (Figure 7).

Gear box 93 is itself filled with oil and spaced well from the engine to minimize heat effects.

Referring now to Figure 6 the frame 3 forwardly has a rigid cross-bar 153 welded between the longitudinal arms thereof (Figure 6) and the ends of the cross-bar provide vertically extending tubular members 155, 157 which receive pintles 159, 161, respectively. The pintles are each secured between the horizontally extending arms of a fork, the forks being indicated at 163, 165 (Figures 3 and 6) and the vertical portions of the forks receive the shafts 167, 169 of the wheels 5.

Steering post 15 is rotatably mounted through a collar 167 welded to cross-bar 153 and connected by linkage (not shown) to tie rods at 169, 171 and at 173, 175 to effect steering movement of the wheels.

Forwardly housing 17 is recessed substantially vertically on opposed sides and is removably secured over cross-bar 153. A latch 177 (Figure 1) removably affixes the housing to a tubular portion of frame 3.

Rearwardly the housing is pivotal with respect to the frame 3. For this purpose frame 3 (Figure 2) is provided with tubular portions 179, 181, 183 which terminate centrally in a nipple 185 adapted to receive downwardly projecting portion 187 of seat 25. A set screw 189 passing through the nipple is adapted to retain the seat in position. This seat is removed to effect pivotal movement of hood 17.

Referring now to Figure 4 wherein one side of the pivotal arrangement is shown the tubular member 3 adjacent the rear bend thereof is threaded and has welded thereto a metal spacer 191 which is also threaded. A screw 193 passes through the spacer and tube in threaded engagement and is retained suitably by washer 195, lock nut 197 and nut 199. Merely loosening latch 177 and raising the hood permits pivot movement on the shoulder 201 of the spacer and the whole interior is exposed for examination. To accommodate the pivoting steering post 15 tapers rearwardly along the line of pivot.

In practice engine 31 is most suitably of 2½–3 horsepower and under the most difficult of cutting conditions the mower will provide comfortable riding. To facilitate foot comfort wing portions 11 taper upwardly forwardly and the dual rear wheel arrangement provides such balance even load conditions on rough terrain at an angle of 30° to the horizontal that no discomfort results to an operator.

It is necessary only for efficient operation that a suitable flow of air to the engine and to the coolant vents or fins of an engine be provided to inhibit undue heating of the engine, bearings, gear box and such; the amount of air flow necessary is of course variable depending upon operating conditions such as the air temperature, the power developed by the engine and so forth. The apparatus of Figure 1 is more than adequate for usual operating conditions the provision of the aperture 34 at air inlet 33 where the engine air inlet 33 is out of contact with the hood being particularly efficient as the air traveling over the skin of the hood swoops readily to the inside and on through to the rear of the vehicle.

The mower is operable in forward and reverse directions and the arrangement of hood and wheels effectively inhibit the entry of cut material to the chain in the reverse direction of operation. This is particularly important as fouling of driving mechanism in lawn mowers is a serious factor, normally resulting in stalling of the equipment.

The dual rear wheel arrangement is itself beneficial in two important respects whether or not the hood is employed. First the utilization of the dual wheel permits the chain transmitting the power to the wheels to lie in the exact longitudinal center line of the equipment—this facilitates turning of the mower for when the chain is off the center line to the left the forward right hand steering wheel tends to be lifted when a right hand turn is made. Also the right hand wheel tends to be lifted when a turn is made to the left as the left hand wheel tends to dig into the ground. The same effect, in reverse, occurs if the chain is off to the right of center the left hand wheel then tending to lift. This effect increases with the lateral distance of the chain from the center line.

Secondly with two closely spaced rear wheels the tendency to rock and for a wheel to lift on unlevel ground is substantially obviated.

The wheels are themselves protected (Figure 7) from entry of cut material thereto by the depending portion of floor plate 9 which extends toward these rear wheels.

The transmission mechanism for controlling the forward and reverse movements is particularly adaptable for mower use, economical, free of mechanism which would require frequent repair, and eliminates the need for a differential mechanism. Most important is the compactness afforded by the bevel gears and the webs in the hollow thereof. Such compactness is essential to permit the box to be mounted appropriately within the relatively narrow frame width common to riding type mowers.

It will be understood that this invention is susceptible to modification in order to adopt it to different usages and conditions and accordingly, it is desired to comprehend such modifications within this invention as may fall within the scope of the appended claims.

I claim:

1. In rider-controlled power driven grounds tending equipment the structure comprising a frame assembly including a bottom plate, forward and rearward wheel means supporting the frame in proximity to the ground, an air-cooled gasoline engine supported forwardly on the assembly and having a power shaft thereof extending downwardly towards said bottom plate, said engine having an exhaust conduit, power transmission means mounted on the assembly above the bottom plate and operably connected with the power shaft of the engine, gear box means mounted rearwardly on the assembly above the bottom plate and having a shaft thereof operably connected to the power transmission means to be driven thereby, means connecting the gear box means with the rearward wheel means for driving of the wheel means, and a hood extending over the rearward wheel means forwardly over the gear box means and the air-cooled engine and substantially enclosing said bottom plate to protect said gear box means and engine from dust.

2. In a differential-less rider-controlled power driven lawn mower having rotary cutting blade means a frame in supporting relation with the cutting blade means, steering wheels supporting the frame forwardly and spaced well apart on either side of a longitudinal center line of the mower, power means including an air-cooled gasoline engine supported by the frame, power transmission means coupled to the power means and also supported by the frame, the frame having a narrowed rearward portion comprising parallel arms, and means supporting the parallel arms, said means including an axle secured between the arms transversely of the mower, a pair of wheels rotatably mounted on the axle and spaced apart and closely adjacent on either side of the longitudinal center line of the mower and positioned between the arms, the said power transmission means being coupled to the rear wheels therebetween, and a seat on the frame above forwardly of the center of the wheels, and a protector in the form of a hood extending longitudinally over the frame below the seat in proximity to the closely adjacent wheels and supported by the narrowed portion of the frame.

3. In a rider-controlled power driven grounds tending vehicle, a frame having a floor plate and a bottom plate carried by and beneath the floor plate defining a vertically extending spacing with the floor plate, the spacing being enclosed and substantially protected from the entry of dust thereto by the floor and bottom plate, forward and rearward wheel means supporting the frame including the bottom plate in close proximity to the ground, an air-cooled gas engine on the floor plate adjacent the forward wheel means, gear box means on the floor plate adjacent the rearward wheel means, transmission means in the spacing, said engine having a power shaft extending through the floor plate into the spacing and said gear box means also having a shaft thereof extending into the spacing through the floor plate, the said shafts being operably connected through the transmission means, means connecting the gear box and rearward wheel means for driving the rearward means from the engine through the transmission and gear box means, a hood extending the length of and beyond the floor plate over the engine and gear box means and over the rearward wheel means to inhibit the entry of dust to the floor plate, said hood having an opening in the top thereof for the passage of air into the engine, and said hood having vent means both forwardly of the engine and rearwardly of the rearward wheel means for passage of air longitudinally of the vehicle over the engine floor plate gear box beyond the rearward wheel means.

4. In rider-controlled power driven lawn tending equipment, the structure comprising a frame assembly including a frame having a bottom plate, forward and rearward wheel means supporting the frame in proximity to the ground, an air-cooled gasoline engine supported forwardly on the frame assembly and having a power shaft thereof extending downwardly towards said bottom plate, said engine having an exhaust conduit, power transmission means mounted on the assembly above the bottom plate and operably connected with the power shaft of the engine, gear box means mounted rearwardly on the assembly above the bottom plate and having a shaft thereof operably connected to the power transmission means to be driven thereby, means connecting the gear box means with the rearward wheel means for driving of the wheel means, and hood means extending at least partially over said engine and having an opening forward thereof for the flow of air longitudinally of the structure over said gas engine, and said hood being open rearwardly.

References Cited in the file of this patent
UNITED STATES PATENTS

| | | |
|---|---|---|
| 778,455 | Lewis | Dec. 27, 1904 |
| 1,511,873 | Davison | Oct. 14, 1924 |
| 2,192,468 | Gore | Mar. 5, 1940 |
| 2,207,447 | Viles et al. | July 9, 1940 |

(Other references on following page)

UNITED STATES PATENTS

| | | |
|---|---|---|
| 2,237,677 | Lewis | Apr. 8, 1941 |
| 2,445,965 | Packwood | July 27, 1948 |
| 2,555,881 | Grangroth et al. | June 5, 1951 |
| 2,620,612 | De Eugenio | Dec. 9, 1952 |
| 2,659,445 | Church | Nov. 17, 1953 |
| 2,670,055 | Dorman et al. | Feb. 23, 1954 |
| 2,748,553 | Funk | June 5, 1956 |
| 2,779,147 | Musgrave | Jan. 29, 1957 |
| 2,792,899 | Piatti | May 21, 1957 |

FOREIGN PATENTS

| | | |
|---|---|---|
| 25,220 | Switzerland | Jan. 16, 1902 |
| 270,733 | Switzerland | Sept. 15, 1950 |
| 1,048,048 | France | July 29, 1953 |
| 695,509 | Great Britain | Aug. 12, 1953 |